(12) United States Patent
Schuld

(10) Patent No.: US 8,293,170 B1
(45) Date of Patent: Oct. 23, 2012

(54) SCENT DISTRIBUTION CARTRIDGE

(75) Inventor: Daniel E. Schuld, Iverness, IL (US)

(73) Assignee: RPS Products, Inc., Hampshire, IL (US)

( * ) Notice: Subject to any disclaimer, the term of this patent is extended or adjusted under 35 U.S.C. 154(b) by 0 days.

(21) Appl. No.: 13/288,580

(22) Filed: Nov. 3, 2011

(51) Int. Cl.
*A61L 9/00* (2006.01)
*A62B 7/08* (2006.01)
*B01D 53/22* (2006.01)
*B01D 50/00* (2006.01)
*B01D 47/00* (2006.01)
*A24F 25/00* (2006.01)

(52) U.S. Cl. .............. 422/1; 422/5; 422/124; 422/306; 96/11; 96/147; 96/152; 96/222; 55/307; 55/434; 55/385.1; 428/905; 239/60; 261/30

(58) Field of Classification Search .............. 422/1, 5, 422/124, 306; 96/11, 147, 152, 222; 55/307, 55/434, 385.1, 484; 428/905; 239/60; 261/30
See application file for complete search history.

(56) References Cited

U.S. PATENT DOCUMENTS

| 4,604,114 | A | 8/1986 | Ward |
| 5,374,381 | A | 12/1994 | Schuld et al. |
| 5,817,168 | A | 10/1998 | Wheless |
| 5,861,128 | A | 1/1999 | Vick et al. |
| 6,886,814 | B1 | 5/2005 | Schuld |
| 2011/0132198 | A1* | 6/2011 | Gallo ........................ 96/222 |

* cited by examiner

*Primary Examiner* — Jill Warden
*Assistant Examiner* — Monzer Chorbaji
(74) *Attorney, Agent, or Firm* — Greer, Burns & Crain, Ltd.

(57) ABSTRACT

The present scent distributor is a cartridge for attaching to a permeable substrate such as an air filter or humidifier pad. The cartridge housing is configured to hold the scenting media, said housing including a body and a cover; a plurality of openings in said housing to allow air to flow through at least a portion of said housing for interaction with the scenting media; a restrictor that slidingly engages with said housing to selectively restrict the flow of air through said housing; and an attachment device on said housing to attach said housing to a porous substrate.

12 Claims, 4 Drawing Sheets

SCENT DISTRIBUTION CARTRIDGE

BACKGROUND

Air freshening devices are a popular means of eliminating common odors from a home. These odors frequently result from bathrooms, pets and cooking, but can originate from a number of sources. The air freshening device adsorbs disagreeable scents, such as litter box smells or frying onions, and/or replaces them with pleasant natural scents like flowers or ocean breezes. Many devices that attack this problem, but function in different ways, are known in the art.

One method of air freshening is through use of a plug-in scenting device, as taught in U.S. Pat. No. 5,136,684. This device plugs into an electrical outlet and uses energy to heat a fragrant gel to scent the area around the device. However, there are disadvantages to this device. It cannot be used where no electricity is available. It consumes energy to distribute the scent. Further, it cannot scent a large area.

In attempts to scent larger areas, fragrance has been incorporated into air filters, as taught in U.S. Pat. No. 5,817,168. A grid of scent-impregnated strands is positioned on the incoming or front side of an air filter. Scent is transferred to the air as it moves through the filter. A similar device is taught in U.S. Pat. No. 4,604,114, where rods containing scent delivering means are inserted into and run from edge to edge of an air filter. Yet another fragrance device attached to an air filter is taught in U.S. Pat. No. 5,861,128. One problem with these filters is that the scent emitted by these filters cannot be adjusted. Additionally, the scented media are incorporated into or permanently attached to the filters themselves, and thus cannot be reused or transferred from one filter to another.

SUMMARY OF THE INVENTION

The above-listed limitations are overcome, at least in part, by the present cartridge for scent distribution. The present scent distributor is a cartridge for attaching to a permeable substrate such as an air filter or humidifier pad. The cartridge housing is configured to hold the scenting media, said housing including a body and a cover; a plurality of openings in said housing to allow air to flow through at least a portion of said housing for interaction with the scenting media; a restrictor that slidingly engages with said housing to selectively restrict the flow of air through said housing; and an attachment device on said housing to attach said housing to a porous substrate.

The housing and cover that have openings which allow air to pass through the interior of the cartridge where a scenting media may be employed. The cartridge also includes a restrictor that selectively blocks between none and all of the openings on at least one side of the cartridge. By selectively blocking between none and all of the openings, the amount of scent distributed by the scenting media is controlled and adjusted. Uncovering more openings or portions of openings relates to increased scent, while covering more openings or portions of openings relates to decreased scent. The openings may also be fully opened, relating to maximal scent, or fully closed, relating to minimal scent.

The scent distributor is energy efficient because it consumes no power. In typical use in conjunction with scenting means, it is attached to an air filter, humidifier wick, or other permeable substrate. When the substrate including the scent distributor is then incorporated into an air handling system, the scent is distributed throughout a room or even a whole house. These systems transfer air through the openings in the cartridge by their normal use, and thus the scent distributor needs no additional power or electricity source to distribute the scent.

By using existing air handling systems, the scent distributor also delivers scent to a larger area than a plug-in scenting device. Air handling systems move air rather than rely on the passive diffusion of a plug-in scenting device. Thus a larger area is effectively scented by the present scent distributor.

The scent distributor is also environmentally friendly and economical because it is reusable and transferrable from one permeable substrate to another. In some embodiments of the present scent distributor, it detaches from the permeable substrate, such as a humidifier pad, without damage to the attachment device of the cartridge. After being used on one or more humidifier pads, the scent distributor is attachable to other pads using the same attachment device. The scent distributor is thus reusable from substrate to substrate in this manner.

When the user tires of the scent or the scent wears out and no longer emits the scent, the cartridge is refilled with the same or a different scent. A new scent distributor need not be purchased each time the scent is depleted and a number of cartridges and their associated packaging are kept from landfills.

The restrictor is adjustable to allow more or less air flow through the openings. This controls the amount of scent by limiting scent release initially when it may be too strong and by exposing new areas of the scenting media to the air as the amount of scent begins to diminish. When used in this manner, the amount of scent may be controlled to desired levels without replacing the scenting media.

The scent distributor is thus an effective, economical, and eco-friendly because it uses no power, can be reused and refilled with different scenting media, and can selectively deliver scent to large areas.

DETAILED DESCRIPTION OF THE INVENTION

All references to direction are intended to be interpreted as if the distributor is oriented as shown in the attached drawings.

Figure 1:
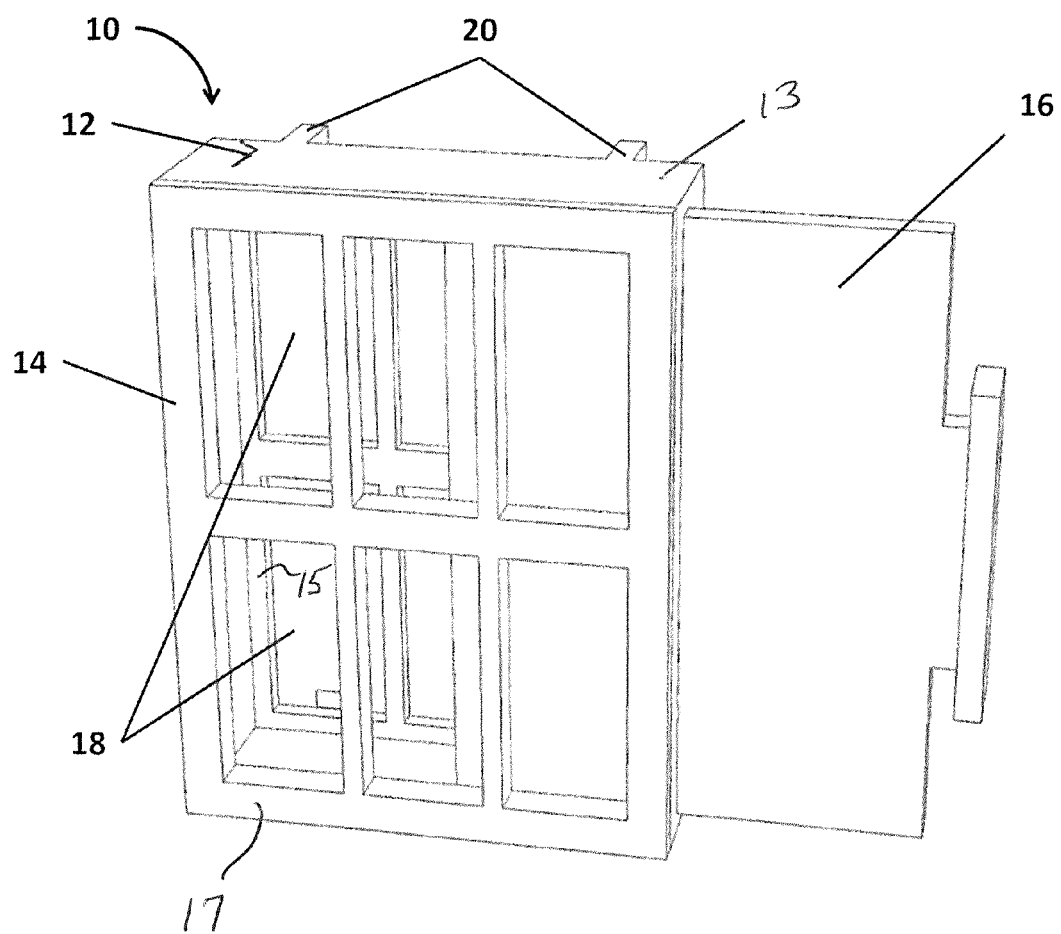
FIG. 1 is a perspective view of the scent distributor with the restrictor in a partially closed position.
Figure 2:
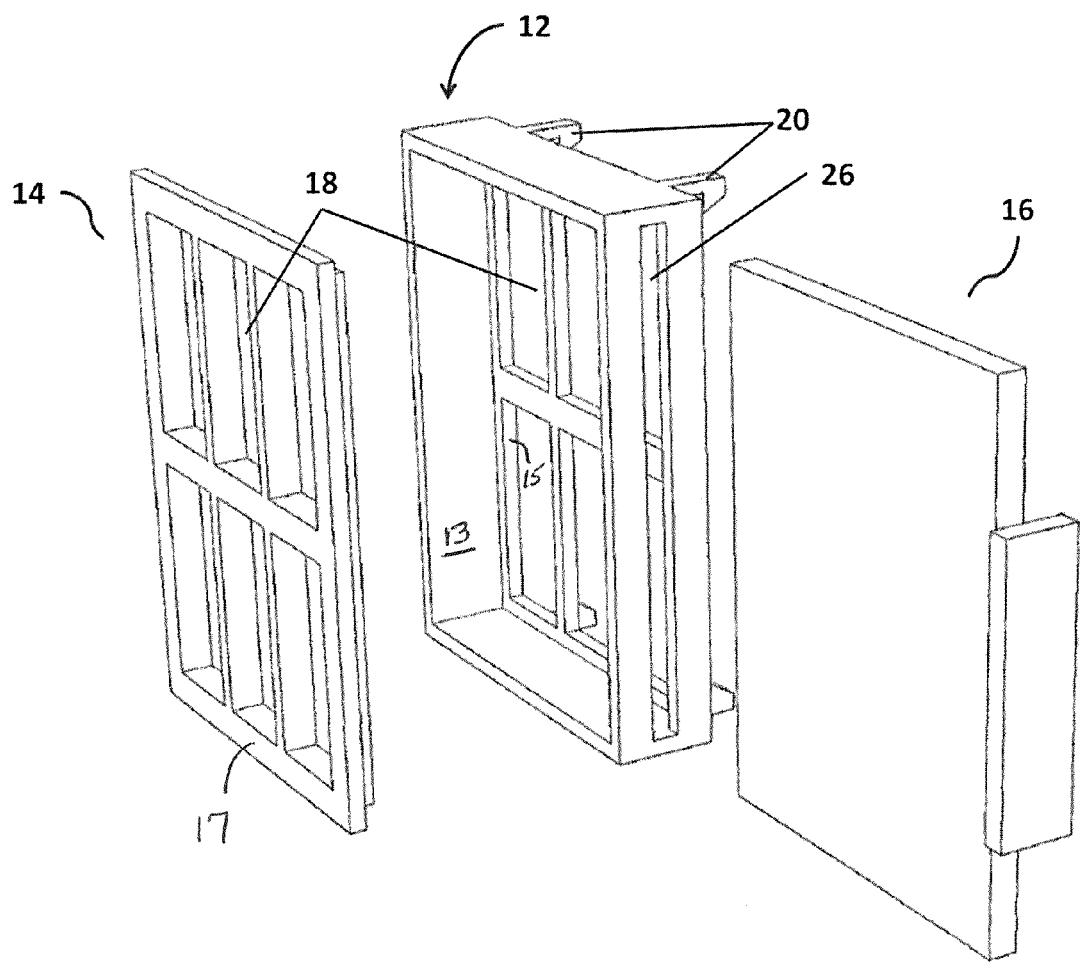
FIG. 2 is a perspective exploded view of the scent distributor.

As shown in FIG. 1, the scent distributor is a cartridge, generally 10. The cartridge generally 10, includes a housing 12, and a restrictor 16. The cartridge 10 has one or more openings 18 and includes one or more attachment device 20. The cartridge 10, as shown in the figures is generally shaped like a block, but this is not intended to be restrictive. In various embodiments, the cartridge 10 is circular, triangular, star-shaped, heart-shaped, or any other useful shape. A cartridge 10 is designed to hold a scenting media 11. The cartridge comprises a housing 12 configured to hold the scenting media 11, the housing including a body 13 and a cover 14. The body 13 includes at least two opposing sides 15, 17. A plurality of openings 18 are included in the housing 12 to allow air to flow through at least a portion of housing 12 for interaction with the scenting media 11. A restrictor 16 slidingly engages with the housing 12 to selectively restrict the flow of air through the housing. An attachment device 20 is located on the housing 12 to attach the housing to a porous substrate 24.

The cartridge 10 has an interior portion 27 and an exterior portion 28. In the closed position, the cover 14 holds the scenting media 11 at least partially within the interior portion 26 of the cartridge 10. When it is necessary to insert scenting media 11 into the cartridge 10, the cover is opened to provide access to the interior portion 26. It is contemplated that the cover 14 need not completely envelope the scenting media 11 within the housing 12. Opening of the cover provides access to the interior portion 26 of the housing while closing of the cover 14 retains the scenting media 11 within the interior of the housing 12. The scenting media 11 is at least partially enclosed within the cartridge 10. Preferably, the cover 14 and housing 12 interact with the scenting media 11 so that the scenting media will not fall out, spill or leak outside of the housing if, for example, the housing is attached to an air filter vertically inserted into an HVAC system.

The scenting media 11 is any device or substance that imparts a scent into air that is passing through the cartridge. Examples of suitable scenting media 11 include, but are not limited to, porous materials that have absorbed a liquid, including one or more scented oils and volatile scented compounds; porous substrate made from scented materials; solid or semi-solid scented gels and sols; scented beads; scented blocks; any solid or semi-solid scented substance that allows for passage of air within or around it; and any other method of delivering scent, known to one in the art, that it can be placed at least partially within the cartridge 10 of the present invention. One preferred embodiment is a porous pad infused with a Splash Scents Brand Humidifier Fragrance, available from Amazon.com.

The cartridge 10 attaches to a permeable substrate, generally 24. In some embodiments, the permeable substrate 24 includes: a humidifier wick, an air filter, and a pre-filter. In normal use, the permeable substrate 24, cartridge 10, and scenting media 11 are placed together into an air handling device, such that air passes through the substrate 24 and housing in a direction normal to the substrate. Permeable substrates 24 are optionally made of paper, particularly filter paper.

Figure 3:
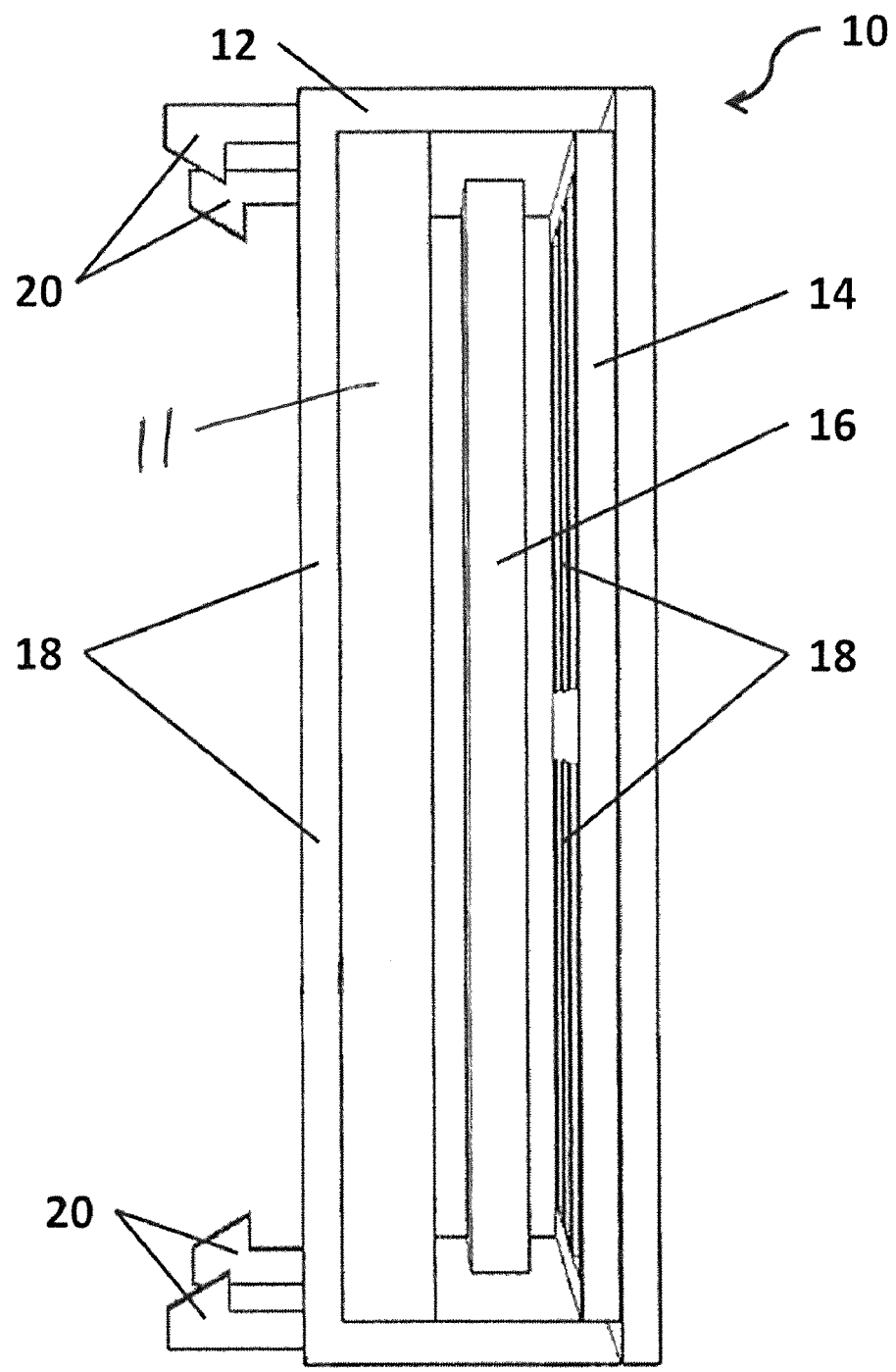
FIG. 3 is a side view of the scent distributor, showing one position of a scenting media.

FIG. 3 is an exploded perspective view of the components of the cartridge 10, including the body 13, cover 14, and restrictor 16. This view shows the restrictor opening 30 in the housing 12. In some embodiments, the restrictor 16 slidingly engages with the housing 12 via the restrictor opening 26. One example of a restrictor opening 30 is a slot.

In some embodiments, the cartridge 10, including the body 13, the cover 14, the restrictor 16, and the attachment device 20, are made of a durable material. Examples of a durable material include, but are not limited to, plastic, metal, cardboard, pressed wood, refined cellulose or any combination thereof. In some embodiments, the durable materials are water-resistant. In other embodiments, the durable materials are water-impermeable. Plastic is a preferred material. Biodegradable plastic is especially preferred. In some embodiments, the same durable material is used for each component of the cartridge 10. One having skill in the art is aware of other materials within the scope of the present invention. The use of the same material for all components may reduce cost of producing the cartridge 10 and increase the compatibility of the components of the cartridge. In other embodiments, different materials are used for at least some components of the cartridge 10.

In some embodiments, the cartridge 10 covers a portion of the surface of the permeable substrate 24. In some embodiments the cartridge 10 covers less than 75% of one surface of a humidifier pad, in further embodiments, less than 50%, and in still further embodiments, less than 25%. In practice, the cartridge 10 is often small compared to the size of the substrate 24 to which it is attached, however, the size of the cartridge will depend on the exact type of scenting media 11 used and the amount of scenting media necessary to produce scent for a reasonable duration. In some embodiments, the scenting media 11 is expected to generate scent for at least 30 days.

Figure 4:
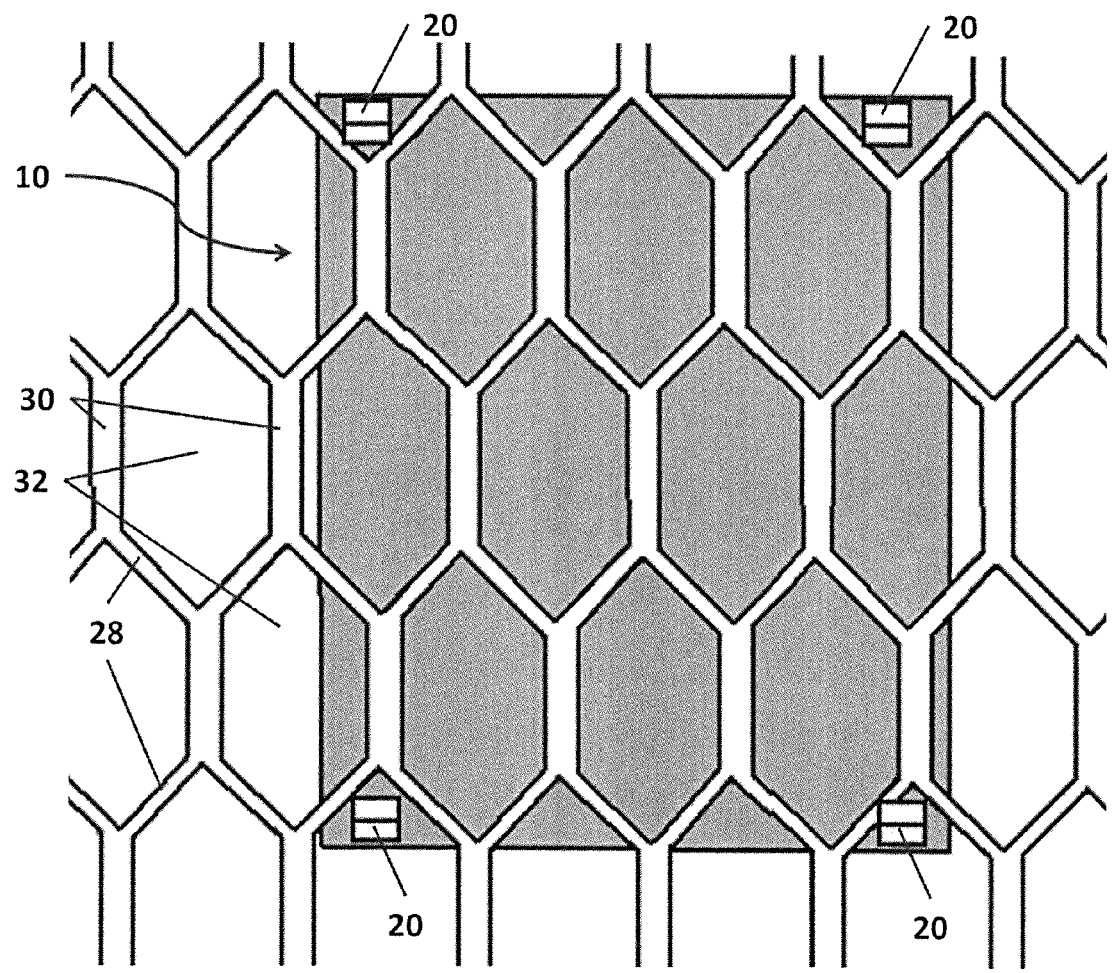
FIG. 4 is a rear view of the housing, showing one interaction of tabs with a humidifier pad.

FIG. 4 shows a bottom exploded view of the cartridge 10. In the shown embodiment, the cover 14 snaps into the body 13 via a compression fitting. This is not meant to be restrictive. In other embodiments, the cover 14 attaches to the housing 12 via a hinge, via a different compression fit, via one or more pins or screws, or by any other such method of attaching a housing and a cover known to one having ordinary skill in the art.

Optionally, the cover 14 is an integral part of the body 13 to make the housing 12. In some embodiments, for example, the body 13 and cover 14 are molded from a single piece of plastic. In some embodiments, the single piece incorporates a hinge-region between the body 13 and cover 14, with the cover then closing into the housing 12 via a compression fit. In still other embodiments, the body 13 and cover 14 are integrated such that they do not move relative to each other, and the scenting median 11 is inserted and removed through an opening 18 in the cartridge 10.

Referring again to FIG. 1, the restrictor 16 interacts with the cartridge 10 to interact one or more openings 18, allowing the amount of air flowing through the cartridge to be adjusted. The restrictor 16 interacts with the restrictor opening 26 in the housing 12 to produce multiple levels of air flow through the housing. At the lowest and highest levels of air flow, the openings 18 of either the body 13 or cover 14 are completely covered by the restrictor 16 or are completely uncovered by the restrictor, respectively. The restrictor 16 is also used in positions intermediate to the completely open or completely closed positions. For example, if the restrictor 16 slidingly engages with the housing 12 through the restrictor opening 26. In an open position, at least a portion of restrictor 16 projects from the interior portion 27 of the housing 12 through the restrictor opening 26 and air is permitted to flow freely through the openings 18. In a closed position, the restrictor 16 comes between the openings 18 of the two opposing sides 15, 17, blocking flow of air through the housing 12. When the restrictor 16 is selectively placed in a half-open position, air flows freely through approximately half of the openings 18 on at least one side of the cartridge 10. This results in less scent being delivered than when the restrictor 16 is in the open position but more than when the restrictor is in the closed position. In some embodiments, the restrictor 16 slidingly engages with the housing 12.

FIG. 3 is a side view of a scent distributor, with the housing 12 cut away to show the internal arrangement of one embodiment of the invention. In the embodiment shown, a single restrictor 16 is located between the openings 18 of the body 13 and the openings 18 of the cover 14. The restrictor 16 need not be in contact with any of the openings 18 in the body 13 or cover 14. As shown, the restrictor 16 restricts the flow of air through the center of the cartridge 10 or optionally restricts or slows the flow of air through portions of the scenting media 11. The restrictor 16 is optionally placed either adjacent to the housing 12 or adjacent to the scenting media 11.

The presence of a restrictor 16 between the openings 18 of the body 13 and cover 14, is not meant to be restrictive. In other embodiments, more than one restrictor 16 covers openings 18 in the body 13 and the cover 14. In still other embodiments, a single restrictor 16 is shaped to cover openings 80 in both the body 13 and the cover 14. In further embodiments, the restrictor 16 is positioned on the outside of either the body 13 or cover 14, for example, by tabs or runners attached to the body or cover.

Optionally, the restrictor 16 is held in place between the restrictor opening 26 in the housing 12. In other embodiments, the restrictor 16 is attached to the housing 12 or cover 14 by compression, by hinge, by tabs, or by any other means known to one in the art.

A preferred method is to slidingly engage the restrictor 16 with the restrictor opening 30 in the housing 12. This method allows a slim profile to the cartridge 10 such that the scent distribution cartridge installed on a furnace filter 24 fits into the space of a furnace (not shown) for the furnace filter. The space for inserting a furnace filter 24 into a furnace it typically very slim. For this reason, in some embodiments of the present invention, a slim profile is preferred. In a further preferred embodiment, the spaces between the restrictor 16, cover 14, and scenting media 11 are reduced such that the restrictor contacts or nearly contacts the cover, the scenting media, or both.

The restrictor 16 need not be limited to a rectangular shape. For example, in an alternate embodiment, the opening 18 of the cover 14 is semi-circular in shape. In this embodiment, the restrictor 16 is also semi-circular in shape, and attaches to the cover 14 via a metal pin (not shown). The restrictor 16 opens and closes by rotation around the pin. Many such embodiments within the scope of the present invention can be envisioned by one having ordinary skill in the art.

Referring again to FIG. 1, the housing 12 contains one or more openings 18. The openings 18 allow air to pass through at least a portion of the cartridge 10 when the restrictor 18 is not fully engaged. In some embodiments, the openings 18 are configured for passing air through the scent delivering means 22 with minimal resistance from the cartridge 10.

In some embodiments, the openings 18 are in the body 13 and the cover 14 of the housing 12. In further embodiments, the openings 18 on the opposing dies 15 are opposed to one another. In other embodiments, the openings 18 of the opposing sides are at least partially offset from one another. A particular number of openings 18 in the cartridge 10 are not required. In some embodiments, the body 13 and cover 14 each contain different numbers of openings 18. In some preferred embodiments, the body 13 and cover 14 each include six rectangular openings 18 that are directly opposed to one other, as shown in FIG. 1. The cartridge 10 is not limited by the number, size, shape, or position of the openings. One having ordinary skill in the art could envision numerous conformations of openings that would each allow air to pass through at least a portion of the cartridge 10 in a manner herein described.

The attachment device 20 connects the cartridge 10 to the permeable substrate 24. In FIG. 5, the attachment device 20 is shown as a pair of tabs 22. The tabs 22, as shown, are directed downward on top of the cartridge 10 and are directed upward on the bottom of the cartridge. This conformation is not intended to be limiting in any manner. The attachment device 20 is oriented in any manner that allows the distributor 20 to attach to the substrate 24. The tabs 22, may all point down, or may have points that are both up and down. The attachment device 20 further includes one or more hooks, tabs, pins, adhesive or any other means known to one in the art for attaching a housing to a porous substrate 24. The attachment device 20 is at least partially on an external surface 30 of the cartridge 10, but is optionally an integral part of the body 13, cover 14, restrictor 16, or any combination thereof. Four attachment devices 20 are shown, but the attachment devices may be of any number.

Referring to FIG. 4, in some embodiments, the attachment device 20 fits between the lattice openings of the substrate 24, such as a humidifier pad 27. One standard method for making the humidifier pad 27 is described in U.S. Pat. No. 6,886,814, which is hereby incorporated by reference in its entirety. When the humidifier pad 22 is made by this method, a lattice with bridges 28, strings 30, and lattice openings 32 results. For example, one effective method has bridges 28⅛ inch in length, strings ¼ inch in length to produce openings 9/16×¼ inches. One having skill in the art, without undue experimentation, can measure the position of the lattice openings 32 in standard humidifier pads to determine the size and placement of attachment device 20 on the cartridge 10. Optimally, the cartridge 10 is designed to fit the lattice openings 32 of several different humidifier pads.

In some embodiments, the attachment device 20 is not damaged when the cartridge 10 is removed from a substrate 24. In this case, the cartridge 10 can be transferred from one substrate 24 to another, or the cartridge may be removed to refill and then reattached to the same substrate. Alternatively, the attachment device 20 is removable from the cartridge 10, such that if the attachment device is damaged, a new attachment device may be employed when the cartridge is refilled. If for example, an adhesive is used to attach the cartridge 10 to the substrate 24, the adhesive would be replaced as needed.

Referring now to the scenting media 11, FIG. 5 demonstrates one possible position for the scenting media. In the embodiment shown, the scenting media 11 is internal to the housing 12, and against the surface of the housing with openings 18.

What is claimed is:

1. A cartridge for holding a scenting media comprising:
   a housing configured to hold the scenting media, said housing including a body and a cover;
   a plurality of openings in said housing to allow air to flow through at least a portion of said housing for interaction with the scenting media;
   a restrictor that slidingly engages with said housing to selectively block the flow of air through said housing; and
   an attachment device on said housing to attach said housing to a porous substrate.

2. The cartridge of claim 1 wherein said housing and said restrictor are each constructed from one of the group consisting of plastic, cardboard, paper, metal, and combinations thereof.

3. The cartridge of claim 2 wherein said housing and said restrictor are each constructed from plastic.

4. The cartridge of claim 1 wherein said cover is removably attached to said housing.

5. The cartridge of claim 1 wherein said attachment device is one or more hooks.

6. The cartridge of claim 5 wherein said hooks are configured to detach from the porous substrate without damage to said cartridge.

7. The cartridge of claim 1 wherein said attachment device is an adhesive.

8. A method for delivering scent comprising:
   providing a cartridge, the cartridge comprising a housing having a plurality of openings, an attachment device and a restrictor movably engaged with the housing, the housing having a body and a cover and the cover providing access to an interior portion of the cartridge;
   opening the cover;

inserting a scenting media;
closing the cover;
attaching the attachment device of the cartridge to a porous substrate through which air is flowing;
moving the restrictor to a position to obtain a desired amount of air flow through the cartridge; and
delivering a scent into the flowing air.

9. The method of claim 8 wherein said attaching step comprises inserting one or more hooks through slits in the porous substrate.

10. The method of claim 8 wherein the housing further comprises a track and said moving step comprises sliding the restrictor along the track.

11. The method of claim 8 wherein said opening step comprises pivoting the cover on a hinge.

12. The method of claim 8 wherein said closing step comprises engaging the cover with the housing by friction.

* * * * *